US009195732B2

(12) United States Patent
Anderson et al.

(10) Patent No.: US 9,195,732 B2
(45) Date of Patent: Nov. 24, 2015

(54) EFFICIENT SQL BASED MULTI-ATTRIBUTE CLUSTERING

(71) Applicant: Optum, Inc., Minnetonka, MN (US)

(72) Inventors: David R. Anderson, Chaska, MN (US); Christopher A. Hane, Irvine, CA (US)

(73) Assignee: OPTUM, INC., Minnetonka, MN (US)

( * ) Notice: Subject to any disclaimer, the term of this patent is extended or adjusted under 35 U.S.C. 154(b) by 122 days.

(21) Appl. No.: 13/843,441

(22) Filed: Mar. 15, 2013

(65) Prior Publication Data

US 2014/0280309 A1 Sep. 18, 2014

(51) Int. Cl.
*G06F 17/30* (2006.01)
*G06F 7/00* (2006.01)
*G06F 17/24* (2006.01)
*G06Q 30/02* (2012.01)

(52) U.S. Cl.
CPC ........ *G06F 17/30598* (2013.01); *G06F 17/245* (2013.01); *G06F 17/30292* (2013.01); *G06F 17/30312* (2013.01); *G06F 17/30427* (2013.01); *G06F 17/30595* (2013.01); *G06Q 30/02* (2013.01)

(58) Field of Classification Search
CPC ............ G06F 17/245; G06F 17/30292; G06F 17/30312; G06F 17/30595; G06F 17/30427; G06Q 30/02
USPC .......................................................... 707/769
See application file for complete search history.

(56) References Cited

U.S. PATENT DOCUMENTS

| 7,653,652 | B2* | 1/2010 | Kagalwala et al. ..... 707/999.103 |
| 7,895,191 | B2* | 2/2011 | Colossi et al. ................ 707/717 |
| 8,554,580 | B2* | 10/2013 | Seward ............................ 705/3 |
| 2002/0103818 | A1* | 8/2002 | Amberden ..................... 707/205 |
| 2010/0100804 | A1* | 4/2010 | Tateishi et al. ................ 715/225 |
| 2012/0290950 | A1* | 11/2012 | Rapaport et al. .............. 715/753 |
| 2014/0172708 | A1* | 6/2014 | Chrapko et al. ................ 705/44 |

OTHER PUBLICATIONS

Friedman, et al., "The bump hunting algorithm", 1998, http://www-stat.stanford.edu/~jhf/ftp/prim.pdf.
Friedman, et al., "Bump hunting in high-deminsional data", Statistics and Computer, 1999, vol. 9, pp. 123-143.
Olivier, et al., "Positively Skewed Data: Revisiting the Box-Cox Power Transformation." 2010, vol. 3, No. 1, pp. 68-75, International Journal of Psychological Research.

* cited by examiner

*Primary Examiner* — Kuen Lu
(74) *Attorney, Agent, or Firm* — Seyfarth Shaw LLP; Brian Michaelis

(57) ABSTRACT

Efficient SQL based multi-attribute clustering of data attributes may be used to identify the most relevant combination of data attributes to an outcome. A global outcome value may be calculated to represent an average of the outcome. A subset outcome value for each subset of data attributes of a plurality of attributes may be calculated to represent average of the outcome for the subset. For each subset of data attributes, a number of members associated with the subset may be compared to a threshold, and the subsets with less members than the threshold may be removed. The subset outcome value for each subset of data attributes may be compared to the global outcome value, and a report may be generated that identifies each subset for which the corresponding subset outcome value is greater than or less than the global outcome value.

21 Claims, 8 Drawing Sheets

EFFICIENT SQL BASED MULTI-ATTRIBUTE CLUSTERING

BACKGROUND OF THE INVENTION

1. Field of the Disclosure

This invention relates to data processing and, more particularly, to data mining.

2. Description of the Related Art

Most corporations, including health insurance corporations, maintain a high volume of data. Such data may be analyzed and exploited for valuable information regarding business trends and other important statistics. Data mining is a common strategy for identifying and analyzing such data.

There are many forms of data mining. For example, custom analytic operations may be developed to meet specific needs. Alternatively, commercially-available statistical analysis tools such as Statistical Analysis Software (SAS) may be used to identify statistical trends in data.

Health insurance companies may maintain databases of health insurance claim information, demographic information, and other data about health insurance plan members. Such information may provide valuable insights into disease causes, progressions, and potential cures. Unfortunately, typical methods for analyzing such data are often cumbersome, costly, and require unworkably high processing times and resources.

For example, conventional methods for identifying relationships between independent and dependent variables are limited to specific combinations of variables, such as pairs or triples or higher order combinations of variables. That is, a user must manually identify variables that are important and request a software package to calculate statistics for those combinations of variables. A user is unable to identify unknown statistically-relevant combinations of variables in this manner.

Furthermore, in conventional systems, intervals with an abundance of useful data are masked by surrounding regions of intervals with little useful data. As a consequence, the most relevant and useful data is not identified in conventional systems. Because the data and identified relationships are commonly used as inputs in predictive regressive models, the predictions yielded by these conventional predictive models are sub-optimal.

The referenced shortcomings are not intended to be exhaustive, but rather, are among many that tend to impair the effectiveness of previously-known techniques of disease management; however, those mentioned here are sufficient to demonstrate that the methodologies appearing in the art have not been satisfactory and that a significant need exists for the techniques described and claimed in this disclosure.

SUMMARY OF THE INVENTION

This disclosure presents systems and methods for efficient multi-attribute clustering, which may be executed in a Structured Query Language (SQL). For example, a system and method is disclosed that, using SQL technology, may identify the most relevant and useful data attribute clusters that contribute to an outcome, such as a health condition diagnosis or healthcare cost. Multi-attribute clustering may allow better modeling and detection in disease scenarios where multiple attributes contribute to a disease. Multi-attribute clustering may also allow the multi-attribute clusters to be efficiently identified using parallel computing. With the most relevant and useful multi-attribute clusters identified, the present disclosure allows predictive models using the multi-attribute clusters as inputs to yield optimal and previously unknown predictions and relationships.

For example, three commonly-prescribed drugs may include X, Y, and Z. Taken independently or in any paired combination, the drugs may be safe. However, in a cluster of patients taking all three drugs concurrently, a rate of adverse events may be high. Multi-attribute clustering allows identifying this combination of drugs with adverse effects without first requiring identification of the drugs in a possible hypothesis regarding the combination of drugs X, Y, and Z.

In one embodiment, a method may include calculating a global outcome value, wherein the global outcome value may represent an average of the outcome for a plurality of members. The method may also include calculating, in parallel, a subset outcome value for each subset of data attributes of a plurality of data attributes. Each subset of data attributes may include a unique combination of at least one data attribute of a plurality of data attributes, and each of the plurality of data attributes may be associated with a plurality of members. The subset outcome value may also represent an average of the outcome for members that are associated with each data attribute of the subset of data attributes.

In certain embodiments, the method may further include comparing, for each subset of data attributes, a number of members associated with the subset of data attributes with a threshold and removing each subset of data attributes for which the number of members associated with the subset is below the threshold. The method may also include comparing, for each subset of data attributes, the subset outcome value for the subset with the global outcome value and generating a report that identifies each subset of data attributes for which the corresponding subset outcome value is greater by a first threshold than or less by a second threshold than the global outcome value.

In another embodiment, the method may be implemented using a database query language, such as SQL; the plurality of members may include at least one of a plurality of persons and a plurality of healthcare providers, and each subset of data attributes identified in the generated report may be input into a regression model to create a predictive model; the threshold may be user defined; and/or the threshold may be algorithmically defined and dynamically adjusted.

Systems for efficient multi-attribute clustering are also disclosed. In one embodiment, the system may include a data storage device configured to store a plurality of data records for a plurality of members, wherein each data record includes a plurality of data attributes. The system may also include a processor in data communication with the data storage device that is configured to calculate a global outcome value, wherein the global outcome value represents an average of the outcome for a plurality of members, and to calculate, in parallel, a subset outcome value for each subset of data attributes of a plurality of data attributes.

According to one embodiment, the processor may be further configured to compare, for each subset of data attributes, a number of members associated with the subset of data attributes with a threshold, and to remove each subset of data attributes for which the number of members associated with the subset is below the threshold. The processor may also be configured to compare, for each subset of data attributes, the subset outcome value for the subset with the global outcome value and to generate a report that identifies each subset of data attributes for which the corresponding subset outcome value is greater than or less than the global outcome value. In one embodiment, the processor is in data communication with the data storage device using a database query language, such as SQL.

In another embodiment, computer program products having a non-transitory computer readable medium with computer executable instructions are presented. In one embodiment, the computer executable instructions perform the operations of calculating a global outcome value, wherein the global outcome value represents an average of the outcome for a plurality of members, and calculating, in parallel, a subset outcome value for each subset of data attributes of a plurality of data attributes.

According to an embodiment, the computer executable instructions may also perform the operations of comparing, for each subset of data attributes, a number of members associated with the subset of data attributes with a threshold, and removing each subset of data attributes for which the number of members associated with the subset is below the threshold. The computer executable instructions may also perform the operations of comparing, for each subset of data attributes, the subset outcome value for the subset with the global outcome value, and generating a report that identifies each subset of data attributes for which the corresponding subset outcome value is greater than or less than the global outcome value. In certain embodiments, the computer executable instructions may be written in a database query language, such as SQL.

The term "coupled" is defined as connected, although not necessarily directly, and not necessarily mechanically.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages could become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Figure 1:
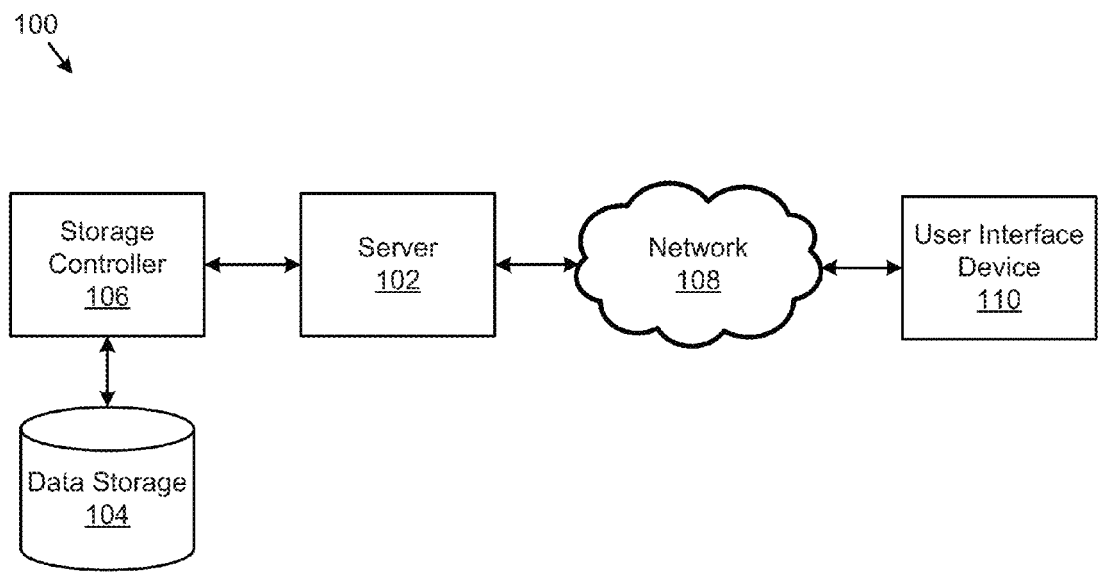
FIG. 1 is a schematic block diagram illustrating one embodiment of a system for multi-attribute clustering.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept could become apparent to those skilled in the art from this disclosure.

Certain units described in this specification have been labeled as modules, in order to more particularly emphasize their implementation independence. A module is "[a] self-contained hardware or software component that interacts with a larger system." Alan Freedman, "The Computer Glossary" 268 (8th ed. 1998). A module comprises a component of a machine, a machine, or a plurality of machines that are suitably programmed to operate according to executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, a controller, or the like.

Modules may also include software-defined units or instructions that, when executed by a processing machine or device, retrieve and transform data stored on a data storage device from a first state to a second state. An identified module of executable code may, for instance, comprise one or more physical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art could recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for multi-attribute clustering. The system 100 may include a server 102 and a data storage device 104. In a further embodiment, the system 100 may include a network 108 and a user interface device 110. In still another embodiment, the system 100 may include a storage controller 106 or storage server configured to manage data communications between the data storage device 104 and the server 102 or other components in communication with the network 108. In an alternative embodiment, the storage controller 106 may be coupled to the network 108. In a general embodiment, the system 100 may store databases comprising records, perform searches of those records, and calculate statistics regarding the records.

Specifically, the system 100 may aggregate records based on data attributes. In still another embodiment, the server 102 may generate a report in response to processing of data attributes and data records. For example, the server 102 may identify and present a subset of data attributes for which the corresponding subset outcome value is greater than or less than the global outcome value.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling the service consumer (user) to enter or receive information. For example, the user may enter one or more attributes, such as age, sex, health condition, a selected attribute for aggregating or reporting a statistic, or the like.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the server 102 may calculate a global outcome value, calculate, in parallel, a subset outcome value for each subset of data attributes, compare, for each subset of data attributes, a number of members associated with the subset of data attributes with a threshold, remove each subset of data attributes for which the number of members associated with the subset of data attributes is below the threshold, compare, for each subset of data attributes, the subset outcome value for the subset of data attributes with the global outcome value, and generate a report that identifies each subset of data attributes for which the corresponding subset outcome value is greater than or less than the global outcome value. In one embodiment, the threshold is set such that the subset outcome value differs from the global outcome value by at least a threshold value where that threshold is chosen based on the subset to establish statistical significance. Additionally, the server 102 may access data stored in the data storage device 104 via a Storage Area Network (SAN) connection, a LAN, a data bus, or the like.

The data storage device 104 may include a hard disk, including hard disks arranged in a Redundant Array of Independent Disks (RAID) array, a tape storage drive comprising a magnetic tape data storage device, an optical storage device, or the like. In one embodiment, the data storage device 104 may store health-related data, such as insurance claims data, consumer data, or the like. The data may be arranged in a database and accessible through Structured Query Language (SQL) queries, or other database query languages or operations.

Figure 2:
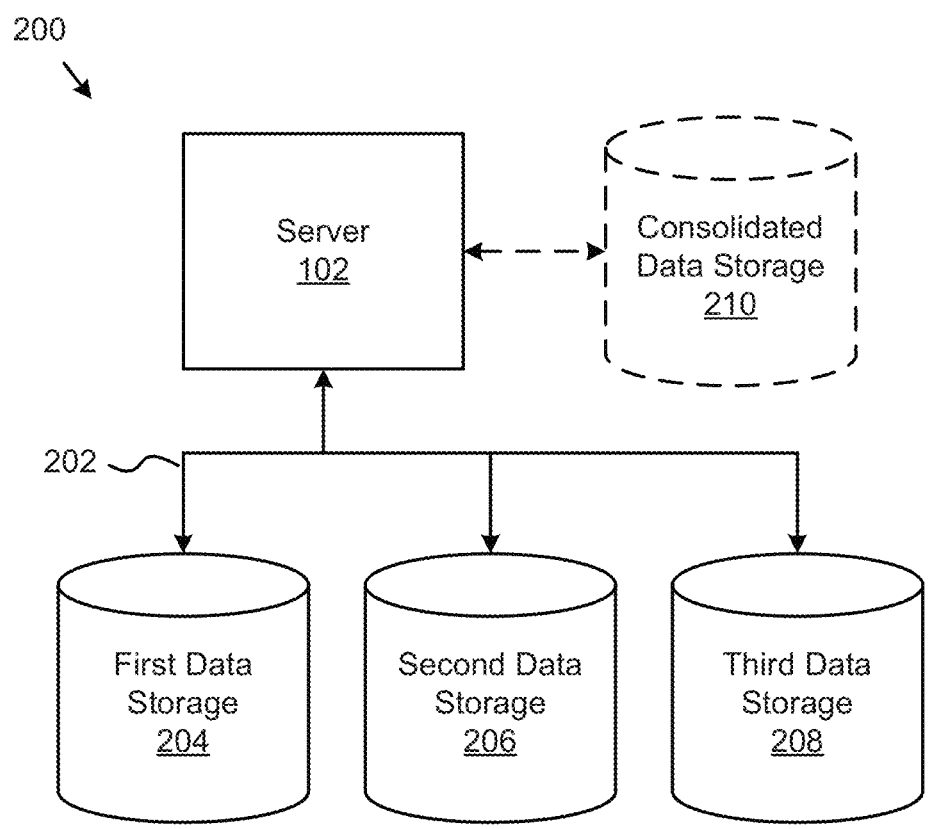
FIG. 2 is a schematic block diagram illustrating one embodiment of a database system for multi-attribute clustering.

FIG. 2 illustrates one embodiment of a database management system 200 configured to store and manage data for multi-attribute clustering. In one embodiment, the system 200 may include a server 102. The server 102 may be coupled to a data-bus 202. In one embodiment, the system 200 may also include a first data storage device 204, a second data storage device 206 and/or a third data storage device 208. In further embodiments, the system 200 may include additional data storage devices (not shown). In such an embodiment, each data storage device 204-208 may host a separate database of healthcare claim information, demographic information, cost data, lab data, physical test data, disease progression data, socioeconomic data, or the like. Alternatively, the storage devices 204-208 may be arranged in a RAID configuration for storing redundant copies of the database or databases through either synchronous or asynchronous redundancy updates.

In one embodiment, the server 102 may submit a query to selected data storage devices 204-208 to collect a consolidated set of data elements associated with an individual or a group of individuals or organizations. The server 102 may store the consolidated data set in a consolidated data storage device 210. In such an embodiment, the server 102 may refer back to the consolidated data storage device 210 to obtain a set of data attributes associated with a specified individual. Alternatively, the server 102 may query each of the data storage devices 204-208 independently or in a distributed query to obtain the set of data elements associated with a specified individual. In another alternative embodiment, multiple databases may be stored on a single consolidated data storage device 210.

In various embodiments, the server 102 may communicate with the data storage devices 204-210 over the data-bus 202. The data-bus 202 may comprise a SAN, a LAN, or the like. The communication infrastructure may include Ethernet, Fibre-Channel Arbitrated Loop (FC-AL), Small Computer System Interface (SCSI), and/or other similar data communication schemes associated with data storage and communication. For example, the server 102 may communicate indirectly with the data storage devices 204-210, the server first communicating with a storage server or storage controller 106.

In one example of the system 200, the first data storage device 204 may store data associated with medical services, procedures, and prescriptions utilized by the individual. In one embodiment, the second data storage device 206 may store data associated with one or more diagnoses of conditions from which the individual suffers and/or actuarial data associated with an estimated cost in medical services that the individual is likely to incur. The third data storage device 208 may store lab test data associated with an individual. For example, the third data storage device 208 may include data associated with the individual's lab test results and/or clinical observations. A fourth data storage device (not shown) may store demographic data. For example, the demographic data may include information relating to the individual's demographics include gender, race or ethnicity, age, income, disabilities, mobility, educational attainment, home ownership, employment status, location, or the like.

The server 102 may host a software application configured for multi-attribute clustering. The software application may further include modules or functions for interfacing with the data storage devices 204-210, interfacing with a network 108, interfacing with a user, and the like. In a further embodiment, the server 102 may host an engine, application plug-in, or application programming interface (API). In another embodiment, the server 102 may host a web service or web accessible software application.

Figure 3:
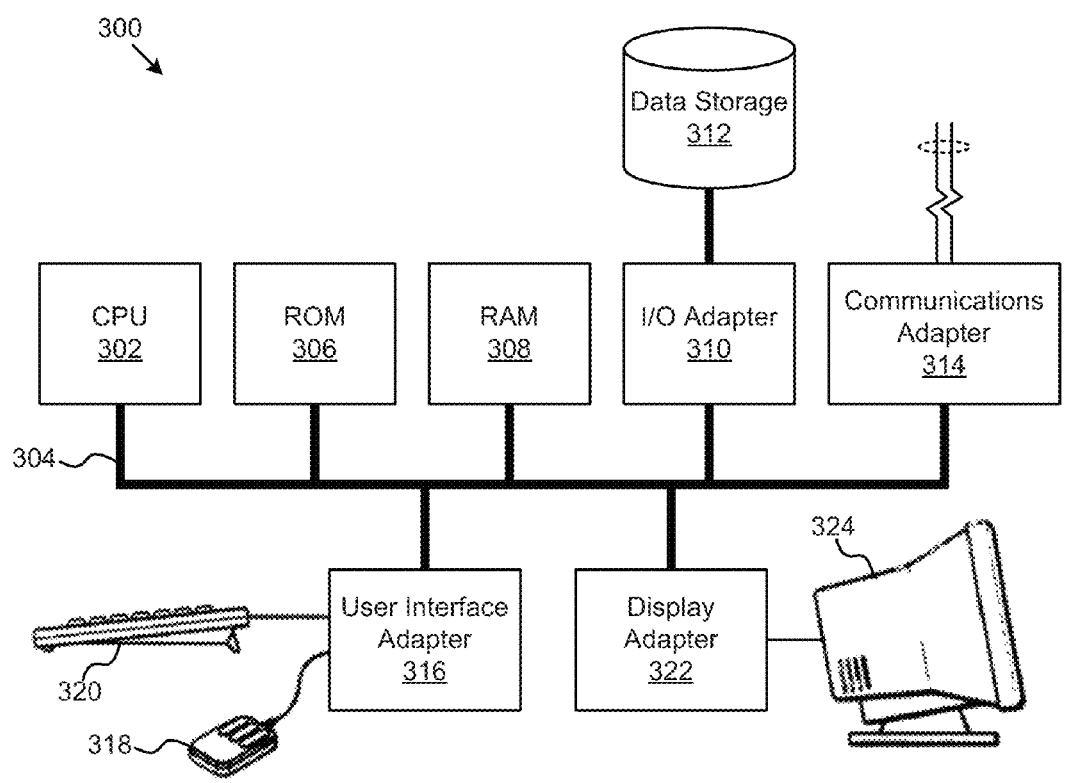
FIG. 3 is a schematic block diagram illustrating one embodiment of a computer system that may be used in accordance with certain embodiments of the system for multi-attribute clustering.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIG. 7.

The computer system 300 also may include Random Access Memory (RAM) 308, which may be SRAM, DRAM, SDRAM, or the like. The computer system 300 may utilize RAM 308 to store the various data structures used by a software application. The computer system 300 may also include Read Only Memory (ROM) 306 which may be PROM, EPROM, EEPROM, or the like. The ROM may store configuration information for booting the computer system 300. The RAM 308 and the ROM 306 may hold user and system 100 data.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for authenticating a user, identifying an individual, or receiving health profile information. In a further embodiment, the display adapter 322 may display a graphical user interface associated with a software or web-based application for multi-attribute clustering.

The I/O adapter 310 may connect one or more storage devices 312, such as one or more of a hard drive, a Compact Disk (CD) drive, a floppy disk drive, a tape drive, to the computer system 300. The communications adapter 314 may be adapted to couple the computer system 300 to the network 108, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of server 102 and/or the user interface device 110. For example, any suitable processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
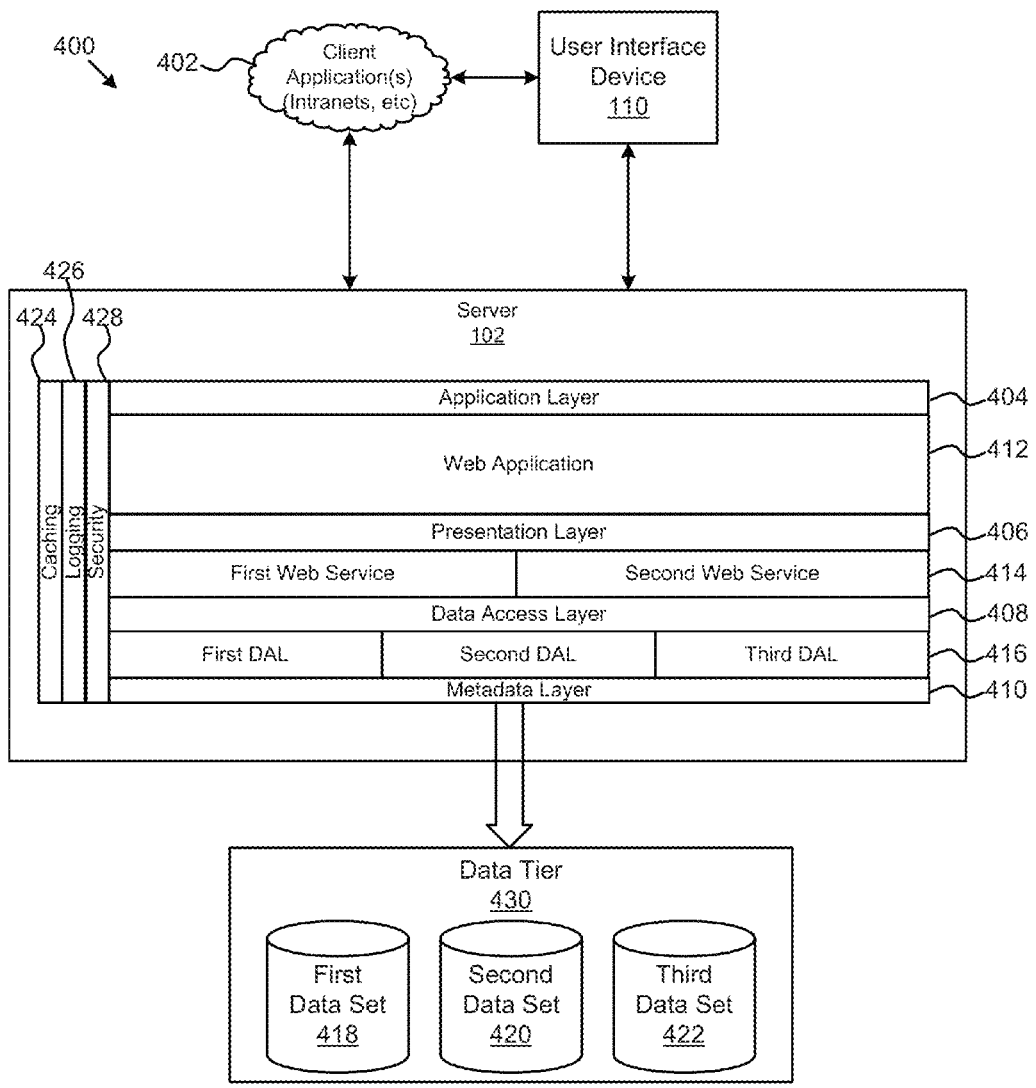
FIG. 4 is a schematic logical diagram illustrating one embodiment of abstraction layers of operation in a system for multi-attribute clustering.

FIG. 4 illustrates one embodiment of a network-based system 400 for multi-attribute clustering. In one embodiment, the network-based system 400 includes a server 102. Additionally, the network-based system 400 may include a user interface device 110. In still a further embodiment, the network-based system 400 may include one or more network-based client applications 402 configured to be operated over a network 108 including an intranet, the Internet, or the like. In still another embodiment, the network-based system 400 may include one or more data storage devices 104.

The network-based system 400 may include components or devices configured to operate in various network layers. For example, the server 102 may include modules configured to work within an application layer 404, a presentation layer 406, a data access layer 408, and a metadata layer 410. In a further embodiment, the server 102 may access one or more data sets 418-422 that comprises a data layer or data tier 430. For example, a first data set 418, a second data set 420, and a third data set 422 may comprise data tier 430 that is stored on one or more data storage devices 204-208.

One or more web applications 412 may operate in the application layer 404. For example, a user may interact with the web application 412 though one or more I/O interfaces 318 and 320 configured to interface with the web application 412 through an I/O adapter 310 that operates on the application layer. In one particular embodiment, a web application 412 may be provided for multi-attribute clustering that includes software modules configured to perform the steps of calculating a global outcome value, calculating, in parallel, a subset outcome value for each subset of data attributes, comparing, for each subset of data attributes, a number of members associated with the subset of data attributes with a threshold, removing each subset of data attributes for which the number of members associated with the subset of data attributes is below the threshold, comparing, for each subset of data attributes, the subset outcome value for the subset of data attributes with the global outcome value, and generating a report that identifies each subset of data attributes for which the corresponding subset outcome value is greater than or less than the global outcome value.

In a further embodiment, the server 102 may include components, devices, hardware modules, or software modules configured to operate in the presentation layer 406 to support one or more web services 414. For example, a web application 412 may access a web service 414 to perform one or more web-based functions for the web application 412. In one embodiment, a web application 412 may operate on a first server 102 and access one or more web services 414 hosted on a second server (not shown) during operation.

For example, a web application 412 for multi-attribute clustering may access a first web service 414 for calculating a global outcome value, and a second web service 414 for calculating, in parallel, a subset outcome value for each subset of data attributes. The web services 414 may compare, for each subset of data attributes, a number of members associated with the subset of data attributes with a threshold and may remove each subset of data attributes for which the number of members associated with the subset of data attributes is below the threshold. The web services 414 may also compare, for each subset of data attributes, the subset outcome value for the subset of data attributes with the global outcome value. In response, the web service 414 may return a report associated with the attributes or profile, statistics, graphs, or the like. One of ordinary skill in the art could recognize various web-based architectures employing web services 414 for modular operation of the web application 412.

In one embodiment, a web application 412 or a web service 414 may access one or more of the data sets 418-422 through the data access layer 408. In certain embodiments, the data access layer 408 may be divided into one or more independent data access layers (DAL) 416 for accessing individual data sets 418-422 in the data tier 430. These individual data access layers 416 may be referred to as data sockets or adapters. The data access layers 416 may utilize metadata from the metadata layer 410 to provide the web application 412 or the web service 414 with specific access to the data sets 418-422.

For example, the data access layer 416 may include operations for performing a query of the data sets 418-422 to retrieve specific information for the web application 412 or the web service 414. In a more specific example, the data access layer 416 may include a query for records associated with individuals who have been diagnosed with degeneration of intervertebral disc or that are associated with an ICD-9 code (e.g., ICD-9-M 722.4) associated with a diagnosis of degeneration of intervertebral disc and also match some additional predetermined attributes, such as age, gender, or residence location.

Figure 5:
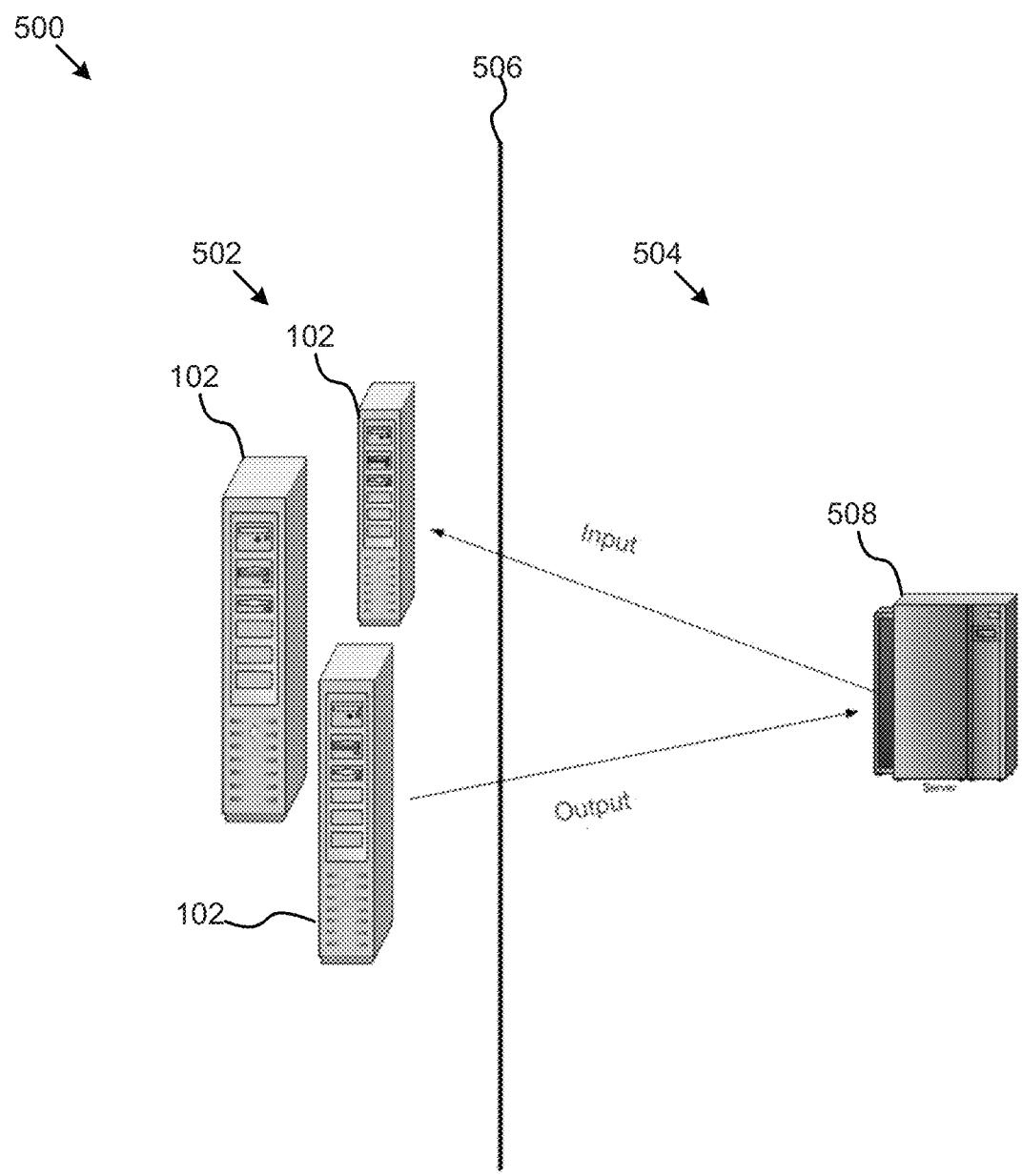
FIG. 5 is a schematic block diagram illustrating one embodiment of a distributed system for multi-attribute clustering.

FIG. 5 illustrates a further embodiment of a system 500 for multi-attribute clustering. In one embodiment, the system 500 may include a service provider site 502 and a client site 504. The service provider site 502 and the client site 504 may be separated by a geographic separation 506.

In one embodiment, the system 500 may include one or more servers 102 configured to host a software application 412 for multi-attribute clustering, or one or more web services 414 for performing certain functions associated with multi-attribute clustering. The system may further comprise a user interface server 508 configured to host an application or web page configured to allow a user to interact with the web application 412 or web services 414 for multi-attribute clustering. In such an embodiment, a service provider may provide hardware 102 and services 414 or applications 412 for use by a client without directly interacting with the client's customers.

Figure 6:
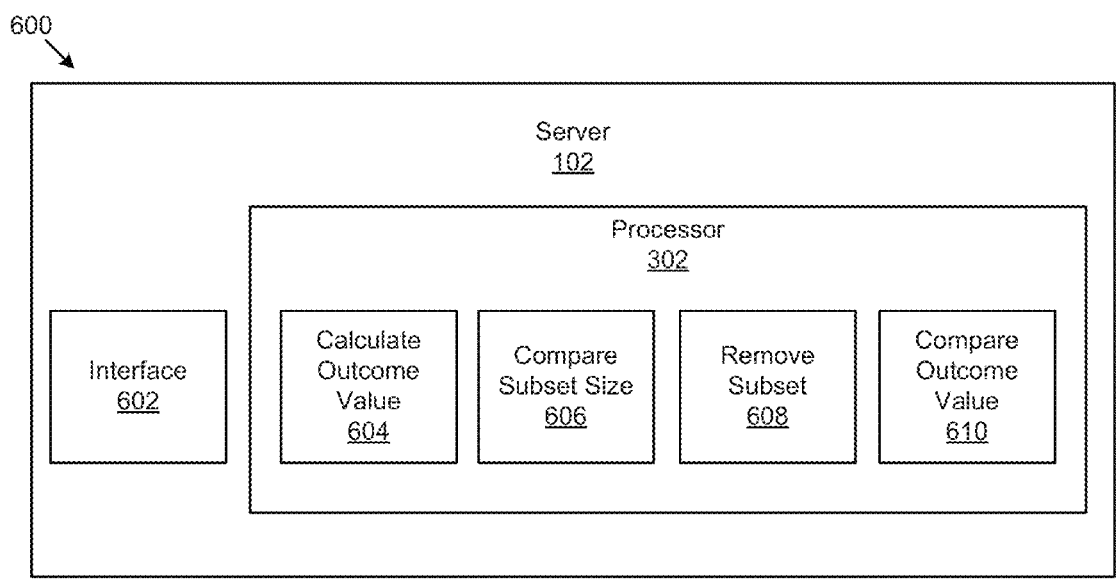
FIG. 6 is a schematic block diagram illustrating one embodiment of an apparatus for multi-attribute clustering.

FIG. 6 illustrates one embodiment of a system 600 for multi-attribute clustering. In one embodiment, the system 600 is a server 102 configured to load and operate software modules 602-610 configured for multi-attribute clustering. Alternatively, the system 600 may include hardware modules 602-610 configured with analogue or digital logic, firmware executing FPGAs, or the like configured to perform the steps of calculating a global outcome value, calculating, in parallel, a subset outcome value for each subset of data attributes, comparing, for each subset of data attributes, a number of members associated with the subset of data attributes with a threshold, removing each subset of data attributes for which the number of members associated with the subset of data attributes is below the threshold, comparing, for each subset of data attributes, the subset outcome value for the subset of data attributes with the global outcome value, and generating a report that identifies each subset of data attributes for which the corresponding subset outcome value is greater than or less than the global outcome value. In such embodiments, the system 600 may include a CPU 302 and an interface 602, such as an I/O adapter 310, a communications adapter 314, a user interface adapter 316, or the like.

In one embodiment, the CPU 302 may load and execute or include one or more software modules configured to calculate a global outcome value, calculate, in parallel, a subset outcome value for each subset of data attributes, compare, for each subset of data attributes, a number of members associated with the subset of data attributes with a threshold, remove each subset of data attributes for which the number of members associated with the subset of data attributes is below the threshold, compare, for each subset of data attributes, the subset outcome value for the subset of data attributes with the global outcome value, and generate a report that identifies each subset of data attributes for which the corresponding subset outcome value is greater than or less than the global outcome value. In one embodiment, these modules may include a calculate outcome value module 604, a compare subset size module 606, a remove subset module 608, and a compare outcome value module 610.

In certain embodiments, an outcome may include a diagnosis code associated with a condition, a healthcare cost, or the like. The condition may be a specific condition or a combination of multiple conditions. For example, the condition may be a short-term disability, a long-term disability, a permanent disability, a disease, a co-morbidity condition, a health-related condition, a retirement, or a combination thereof. Such a disease may include any disease known to persons of ordinary skill in the art, such as a neoplasm.

Data attributes may, in certain circumstances, include a plurality of attributes. For example, attributes may include health insurance claim data, cost data, lab data, physical test data, disease progression data, socioeconomic data, pharmacy data, psychographic data, absenteeism, worker compensation data, or the like. Data attributes may also include data associated with medical services, procedures, and prescriptions utilized by the individual. In another embodiment, data attributes may include data specifying gender, race or ethnicity, age, minority status, income, disabilities, mobility, educational attainment, home ownership, employment status, location, or the like. Each of the plurality of data attributes may be associated with a plurality of members. In an embodiment, the members for which data attributes are associated may include a plurality of persons, healthcare providers, hospitals, organizations, or the like.

In a further embodiment, the attributes may include a temporal component. For example, the attribute may include a time period associated with the condition a long term disability such as, for example, malignant neoplasm of large intestine. In such an embodiment, the attribute would include the disability condition and a related time frame, such as a median life expectancy of the cancer. In such an example, the group of records may include all large intestine cancer patients with information within the specified time frame of cancer onset or initial diagnosis (which could be either an ICD9 code or a lab reading or both). In certain embodiments, a timestamp may be used to identify data attribute patterns over time.

Although the various functions of the server 102 and the CPU 302 are described in the context of modules, the methods, processes, and software described herein are not limited to a modular structure. Rather, some or all of the functions described in relation to the modules of FIG. 6 may be implemented in various formats including, but not limited to, a single set of integrated instructions, commands, code, queries, etc. In one embodiment, the functions may be implemented in database query instructions, including SQL, PLSQL, or the like. Alternatively, the functions may be implemented in software coded in C, C++, C#, php, Java, or the like. In still another embodiment, the functions may be implemented in web-based instructions, including HTML, XML, etc.

Generally, the interface module 602 may receive inputs and display outputs, such as reports, graphs, statistics, or the like. For example, the interface module 602 may receive one or more attributes. The interface module 602 may further receive a threshold value to which subsets of data attributes are compared. In a further embodiment, the interface module 602 may display analysis results based on the analysis of data attributes and subsets of data attributes. Such analysis results may include reports, statistics, tables, charts, graphs, recommendations, or the like.

Structurally, the interface module 602 may include one or more of an I/O adapter 310, a communications adapter 314, a user interface adapter 316, and/or a display adapter 322. The interface module 602 may further include I/O ports, pins, pads, wires, buses, and the like for facilitating communications between the processor 302 and the various adapters and interface components 310-324. The interface module may also include software defined components for interfacing with other software modules on the CPU 302.

In a specific embodiment, the CPU 302 may load and execute computer software configured to generate, retrieve, send, or otherwise operate SQL instructions. For example, the calculate outcome value module 604 may communicate an SQL query to the data storage device 104 which is configured to calculate global outcome values. A global outcome value may be associated with a single data attribute or a plurality of data attributes and may represent the average of the outcome for a plurality of members. The outcome may be any result for which an analysis may be sought to identify data attributes that contribute to the result. For example, in one embodiment, the outcome may be the overall healthcare cost incurred by an individual, and the global outcome value may be X, where X is the average healthcare cost for all the members for which healthcare cost data is available.

The calculate outcome value module 604 may also be configured to calculate a subset outcome value for each subset of data attributes of a plurality of data attributes. Each subset of data attributes may include a unique combination of at least one data attribute of a plurality of data attributes. Any combination of data attributes that is redundant, and therefore not unique, regardless of the order in which the data attributes are grouped in a subset of data attributes, is removed from any further processing of the subsets. A subset of data attributes may include any number of data attributes. Therefore, in one embodiment, a subset of data attributes may include one data attribute, while in another embodiment, a subset of data attributes may include at least two data attributes.

The subset outcome value may be associated with a single data attribute or a plurality of data attributes and may represent the average of the outcome for members that are associated with each data attribute of the subset of data attributes. As an example, the subset of data attributes may include a data attribute specifying individuals between the age of 19 and 24, a data attribute specifying individuals living in Rhode Island, and a data attribute specifying individuals living in a multi-family dwelling. Taken together, this subset of attributes will be associated with all members who are between the age of 19 and 24 and who live in a multifamily dwelling in Rhode Island. Continuing with the previous example in which the outcome is the overall healthcare cost incurred by an individual, the calculated subset outcome value for this subset of members may be Y. Therefore, the average healthcare cost incurred by all members between the age of 19 and 24, and that live in a multi-family dwelling in Rhode Island, is, for example, Y.

In another embodiment, the subset of data attributes may identify a group of members having records with data attributes that include a specified ICD-9 diagnosis code and a demographic feature corresponding to the member's profile. For example, the subset of data attributes may specify individuals associated with a specific diagnosis and certain age ranges, gender, residence, and/or comorbidity.

The calculate outcome value module 604 may be configured to calculate a subset outcome value for each subset in parallel. For example, the calculate outcome value module 604 may utilize a database query language, such as a SQL, to control the calculation of each subset of data attributes. SQL queries may cause the calculation of the subset outcome values to be performed in parallel.

In one embodiment, the compare subset size module 606 may be configured to compare, for each subset of data attributes, a number of members associated with the subset of data attributes with a threshold. The threshold may be user-defined or may be calculated and defined based on an algorithm. According to one embodiment, a threshold based on an algorithm may be dynamically adjusted. The threshold may specify the minimum number of members that may be associated with a subset of data attributes. If the number of members associated with the subset of data attributes is below the threshold, the subset is removed from further processing of the subsets. For example, in one embodiment, the remove subset module 608 may be configured to remove each subset of data attributes for which the number of members associated with the subset is below the threshold.

By setting a minimum number of members that must be associated with a subset of attributes, and removing those subsets for which the number of associated members is below the threshold, the possibility of having insignificant subsets of data attributes appear significant is reduced. For example, even though a subset of data attributes for which three members are associated may yield a significantly high (or low) subset outcome value, the subset is not as relevant to the outcome as a subset of data attributes that yields a smaller (or higher) subset outcome value, but includes a larger number of members. Data processed by the compare subset size module 606 and the remove subset module 608 ensure that only the most relevant subsets of data attributes are considered and identified in the subsequent report.

The compare outcome value module 610 may be configured to compare, for each subset of data attributes, the subset outcome value for the subset with the global outcome value and to generate a report that identifies each subset of data attributes for which the corresponding subset outcome value is greater than or less than the global outcome value. In certain embodiments, statistical methods may also be used to identify the subsets of data attributes that have corresponding subset outcome values greater than or less than the global outcome value. Using the example previously discussed, the compare outcome value module 610 may compare Y to X. If Y is greater than X by a first threshold (e.g., if the average healthcare cost incurred by all members between the age of 19 and 24, and that live in a multi-family dwelling in Rhode Island is greater than the average healthcare cost for all the members for which healthcare cost data is available), then the subset of data attributes for which the subset outcome value is Y may be a strong indicator of data attributes that increase the cost of healthcare. That is, the multi-attribute cluster that includes members between the age of 19 and 24 that live in Rhode Island and that live in a multifamily dwelling, may be a multi-attribute cluster that yields a strong indication of high healthcare costs. However, if after Y is compared to X, it is determined that Y is less than X by a second threshold, then the subset of data attributes for which the subset outcome value is Y may be a strong indicator of data attributes that reduce the cost of healthcare. The first threshold and the second threshold may be adjusted by the user or adjusted dynamically to select particular subsets that are statistically meaningful. For example, the first threshold and the second threshold may be set such that subsets that are one standard deviation from the global outcome value are selected. Multi-attribute clusters identified as described above may be input to a predictive model to obtain predictions based on the data attributes, such as healthcare expenditure.

The report generated by the compare outcome value module 610 may identify each subset of data attributes for which the corresponding subset outcome value is greater than or less than the global outcome value. The report may be output in a variety of ways. For example, the report may be output using the interface module 602 as a list of all subsets greater than or less than the global outcome value. The report may be a graph or numerical statistic illustrating which multi-attribute clusters (e.g., the subsets of data attributes with an associated subset outcome value greater than or less than the global outcome value) yield high (or low) subset outcome values. The report may illustrate the relationship of all the data attributes that contribute to a high number of subsets. One skilled in the art will readily recognize that numerous alternative outputs may be presented using the results of the compare outcome module 610 without departing from the disclosure in spirit or scope. According to one embodiment, each subset of data attributes identified in the generated report may be provided as input to a regression model to create an optimal predictive model.

Figure 7:
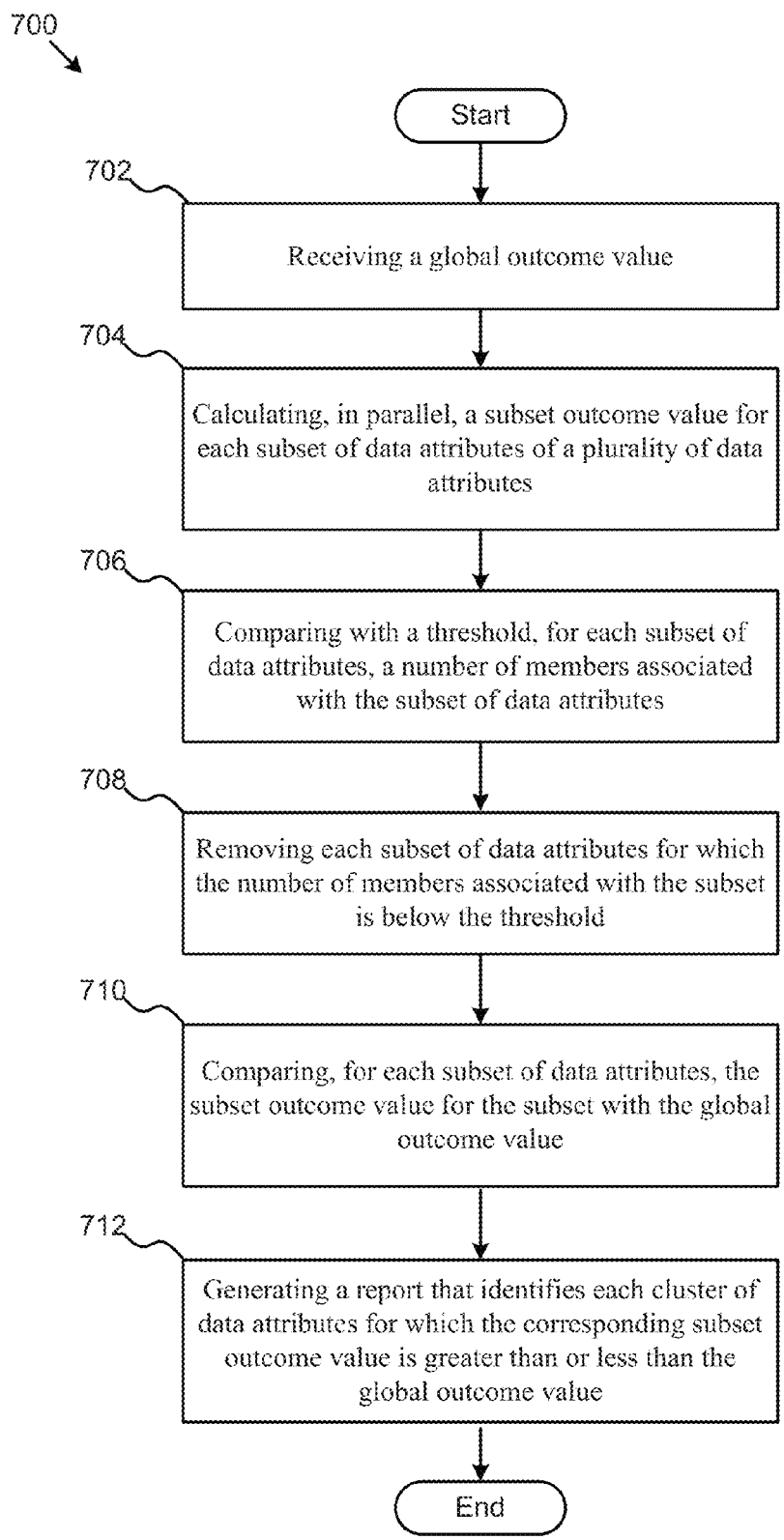
FIG. 7 is a flow chart illustrating one embodiment of a method for multi-attribute clustering.

FIG. 7 illustrates one embodiment of a method 700 for multi-attribute clustering. The method 700 starts at block 702 with receiving a global outcome value. The global outcome value may be input by a user to set a threshold for identifying subsets of data attributes. In one embodiment, the global outcome value may be calculated as the global outcome value represents an average of the outcome for a plurality of members. The method may, at block 704, include calculating, in parallel, a subset outcome value for each subset of data attributes of a plurality of data attributes. Each subset of data attributes may include a unique combination of at least one data attribute of a plurality of data attributes and each of the plurality of data attributes may be associated with a plurality of members. The subset outcome value may also represent an average of the outcome for members that are associated with each data attribute of the subset of data attributes. At block 706, the method 700 may also include comparing, for each subset of data attributes, a number of members associated with the subset of data attributes with a threshold, and, at block 708, the method 700 may include removing each subset of data attributes for which the number of members associated with the subset is below the threshold.

In one embodiment, the threshold may be user defined, while in another embodiment, the threshold may be algorithmically-defined and dynamically adjusted. For example, the threshold may be adjusted based on the number of members with each data attribute of the subset of data attributes. When only a few patients with the data attributes exist, the threshold may be reduced, because a smaller number of members matching the subset of data attributes is required for the result to be statistically significant. That is, if ten members have data attribute A, ten members have data attribute B, and ten members have data attribute C, then a threshold of five may be set. But, if one hundred members have data attribute A, one hundred members have data attribute B, and one hundred members have data attribute C, then a threshold of fifty may be set. In another embodiment, the threshold may be set according to a statistical significance test.

According to an embodiment, the method 700 may compare, for each subset of data attributes, a subset outcome value for the subset with the global outcome value at block 710. The method 700 may also, at block 712, include generating a report that identifies each subset of data attributes for which the corresponding subset outcome value is greater than or less than the global outcome value. Additional reports may include ranges and trends for treatment patterns and costs, as well as statistics including averages, probabilities, and other computational products.

In another embodiment, the method 700 may be implemented using a database query language, such as SQL. In certain embodiments of the disclosure, the plurality of members may include at least one of a plurality of persons and a plurality of healthcare providers, and each subset of data attributes identified in the generated report may be input into a regression model to create a predictive model.

The method 700 may be repeated for different orders of comparisons. For example, the method 700 may be first performed for sets of two data attributes to generate interesting clusters of data attributes, in which the cluster meets a threshold size. The method 700 may then be repeated for sets of three data attributes to generate interesting clusters of data attributes, in which the cluster meets a threshold size. The method 700 may further be repeated for higher orders of data attributes. Clusters from each repetition of permutations may be stored and combined in a single report.

Figure 8:
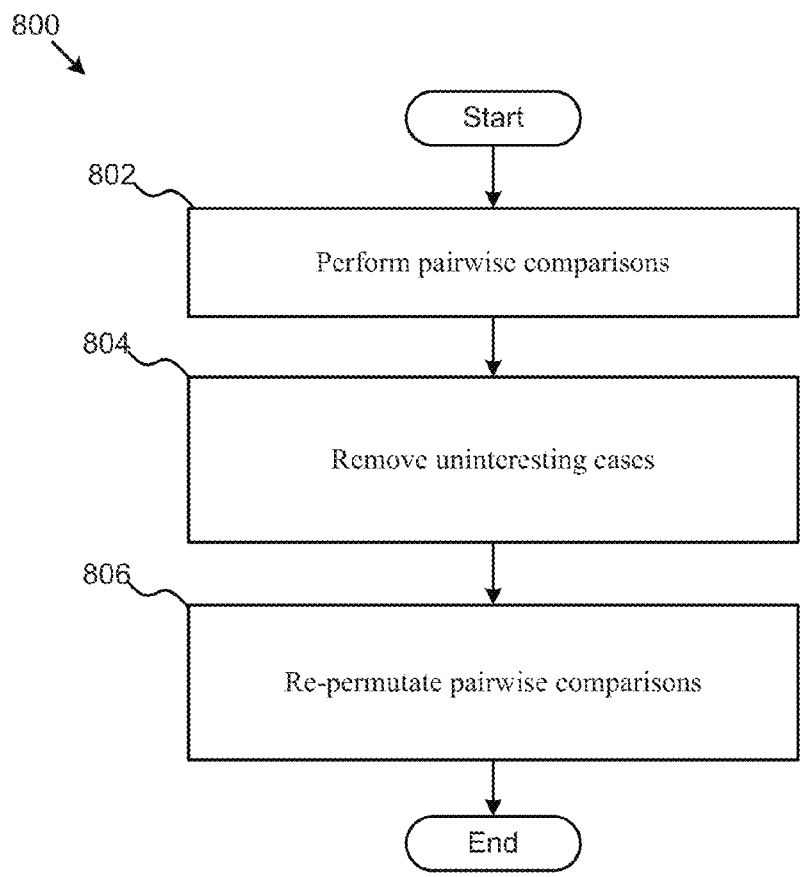
FIG. 8 is a flow chart illustrating one embodiment of a method for parallel calculation of outcome values for subsets of data attributes.

Parallelization of subset outcome values at block 704 may improve performance of the method 700 and improve the capability of finding subsets of data attributes that have meaningful outcomes. Conventionally, comparison of a large number of subsets of data attributes is time consuming. For large sets of data attributes, it may be difficult to identify relevant subsets of the data attributes. FIG. 8 illustrates one embodiment of a method 800 for parallel calculation of outcome values for subsets of data attributes. In one embodiment, the parallelization is performed within a server.

The method 800 begins at block 802 with performing pairwise comparisons of subsets data attributes. To reduce a number of calculations performed at block 802, redundant subsets of data attributes may be skipped. For example, when a subset of data attributes includes A and B, a future subset of data attributes including B and A may be skipped. At block 804, comparisons resulting in an outcome value below are threshold are removed, because the comparisons yielded uninteresting or statistically insignificant results. For example, when the number of patients with a particular subset of data attributes is too small, that subset of data attributes may be removed from further clustering calculations. At block 806, the method 800 re-permutates pairwise combinations and returns to block 802 to repeat the method 800. When coded in SQL, the method 800 may be executed using nested inline views that feed other views to simulate program flow with filters at appropriate stages.

By identifying subsets of data attributes with high outcome values, data attributes of a patient that cluster prior to a disease's onset may be identified. The healthcare professionals responsible for that patient may be notified of the clustering of data attributes for the patient. The healthcare professionals may intervene to prevent progression of the disease or intervene while the disease is in early stages. Identified subsets of data attributes with high outcome values may also be useful in estimating the response for a patient to a particular treatment. The patient's healthcare professionals may be provided with information that the patient has a cluster of data attributes that suggest a particular result if a certain treatment is provided. Thus, the healthcare professionals may be provided advance information, based on the statistical methods described above, which treatments may be beneficial and which treatments are likely to have adverse outcomes.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus, and components may be eliminated or substituted for the components described herein where the same or similar results would be achieved. All such similar substitutes and modifications apparent to those skilled in the art are deemed to be within the spirit, scope, and concept of the invention as defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present processes, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    receiving a global outcome value, wherein the global outcome value is a global threshold for identifying a plurality of subsets of data attributes;
    calculating, in parallel, a plurality of subset outcome values for the plurality of subsets of data attributes, respectively, of a plurality of data attributes, wherein each subset outcome value of a subset of data attributes represents an average value of a data attribute outcome for members that are associated with each of the data attributes of the subset of data attributes;
    comparing, for each subset of data attributes, a number of members associated with the subset of data attributes with a size threshold;
    removing each subset of data attributes for which the number of members associated with the subset is below the size threshold;
    comparing, for each subset of data attributes, the subset outcome value for the subset with the global outcome value as the global threshold for identifying a plurality of subsets of data attributes; and
    generating a report that identifies each subset of data attributes for which the corresponding subset outcome value is greater by a first threshold than or less by a second threshold than the global outcome value.

2. The method of claim 1, wherein the method is implemented using a database query language.

3. The method of claim 1, wherein the global outcome value represents an average value of the data attribute outcome for a plurality of members and is calculated based on inputs from a user through a user interface.

4. The method of claim 3, wherein the plurality of members comprise a plurality of patients.

5. The method of claim 1, further comprising receiving the size threshold as an input from a user through a user interface.

6. The method of claim 1, further comprising algorithmically defining the size threshold.

7. The method of claim 1, wherein each subset of data attributes identified in the generated report is input into a regression model to create a predictive model.

8. A system, comprising:
    a data storage device configured to store a plurality of data records for a plurality of members, wherein each data record comprises a plurality of data attributes;
    a processor in data communication with the data storage device and configured to:
        receive a global outcome value, wherein the global outcome value is a global threshold for identifying a plurality of subsets of data attributes;
        calculate, in parallel, a subset outcome value for the plurality of subsets of data attributes of a plurality of data attributes, wherein each subset outcome value of a subset of data attributes represents an average value of a data attribute outcome for members that are associated with each of the data attributes of the subset of data attributes;
        compare, for each subset of data attributes, a number of members associated with the subset of data attributes with a size threshold;
        remove each subset of data attributes for which the number of members associated with the subset is below the size threshold;
        compare, for each subset of data attributes, the subset outcome value for the subset with the global outcome value as the global threshold for identifying a plurality of subsets of data attributes; and
        generate a report that identifies each subset of data attributes for which the corresponding subset outcome value is greater by a first threshold than or less by a second threshold than the global outcome value.

9. The system of claim 8, wherein the processor is in data communication with the data storage device using a database query language.

10. The system of claim 8, wherein the global outcome value represents an average value of the data attribute outcome for a plurality of members and is calculated based on inputs from a user through a user interface.

11. The system of claim 10, wherein the plurality of members comprise a plurality of patients.

12. The system of claim 8, further comprising receiving the size threshold as an input from a user through a user interface.

13. The system of claim 8, further comprising algorithmically defining the size threshold.

14. The system of claim 8, wherein each subset of data attributes identified in the generated report is input into a regression model to create a predictive model.

15. A computer program product, comprising a non-transitory computer readable medium having computer executable instructions to perform operations comprising:

receiving a global outcome value, wherein the global outcome value is a global threshold for identifying a plurality of subsets of data attributes;

calculating, in parallel, a subset outcome value for the plurality of subsets of data attributes of a plurality of data attributes, wherein each subset outcome value of a subset of data attributes represents an average value of a data attribute outcome for members that are associated with each of the data attributes of the subset of data attributes;

comparing, for each subset of data attributes, a number of members associated with the subset of data attributes with a size threshold;

removing each subset of data attributes for which the number of members associated with the subset is below the size threshold;

comparing, for each subset of data attributes, the subset outcome value for the subset with the global outcome value as the global threshold for identifying a plurality of subsets of data attributes; and generating a report that identifies each subset of data attributes for which the corresponding subset outcome value is greater by a first threshold than or less by a second threshold than the global outcome value.

16. The computer program product of claim 15, wherein the computer executable instructions are written in a database query language.

17. The computer program product of claim 15, wherein the global outcome value represents an average value of the data attribute outcome for a plurality of members and is calculated based on inputs from a user through a user interface.

18. The computer program product of claim 17, wherein the plurality of members comprise a plurality of patients.

19. The computer program product of claim 15, wherein the medium further comprises computer executable instructions to perform operations comprising receiving the size threshold as an input from a user through a user interface.

20. The computer program product of claim 15, wherein the medium further comprises computer executable instructions to perform operations comprising algorithmically defining the size threshold.

21. The computer program product of claim 15, wherein each subset of data attributes identified in the generated report is input into a regression model to create a predictive model.

* * * * *